Figure 1:
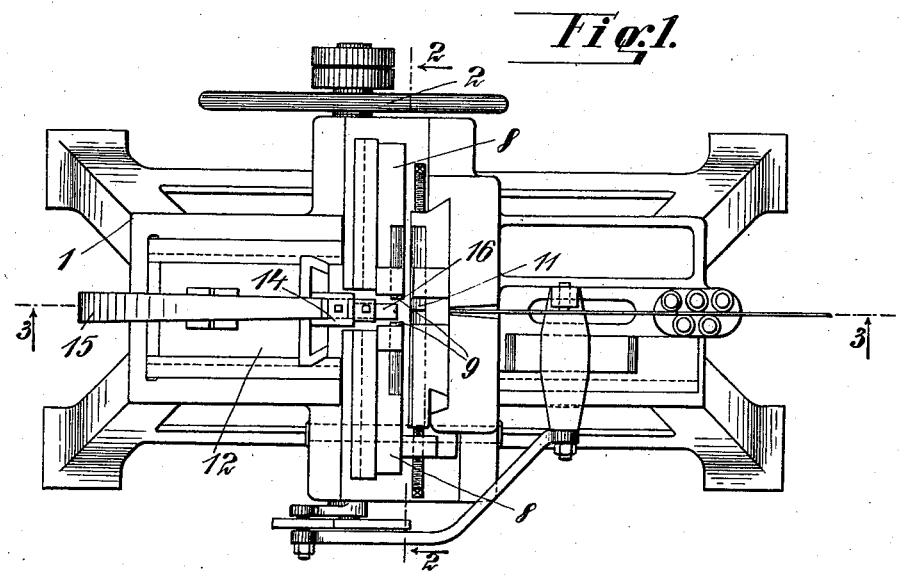

J. WIKSCHTRÖM.
MACHINE FOR MAKING WIRE NAILS AND PINS.
APPLICATION FILED JAN. 22, 1910.

1,014,732.

Patented Jan. 16, 1912.
6 SHEETS—SHEET 1.

Witnesses

Inventor
Jakob Wikschtröm
by his attorneys

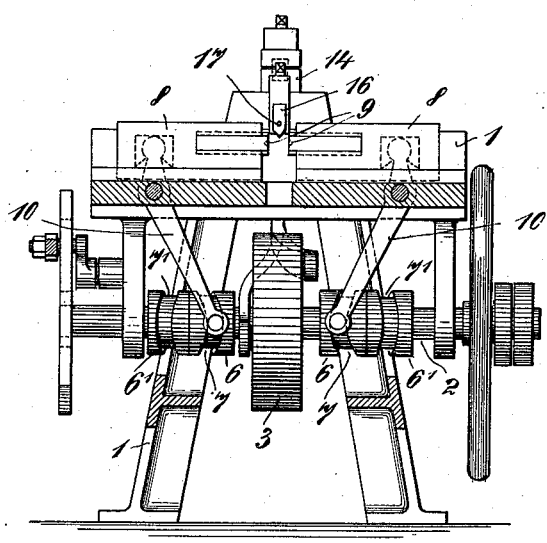

J. WIKSCHTRÖM.
MACHINE FOR MAKING WIRE NAILS AND PINS.
APPLICATION FILED JAN. 22, 1910.
1,014,732.
Patented Jan. 16, 1912.
6 SHEETS—SHEET 3.
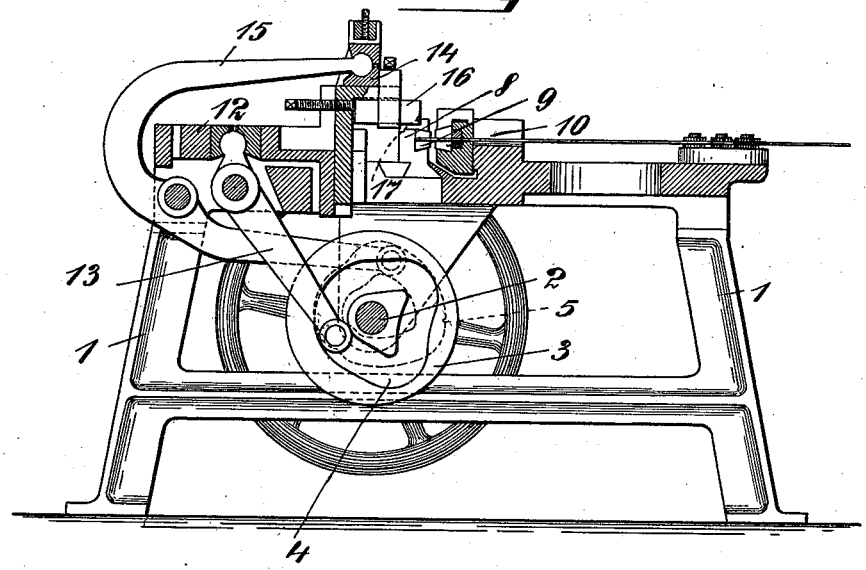
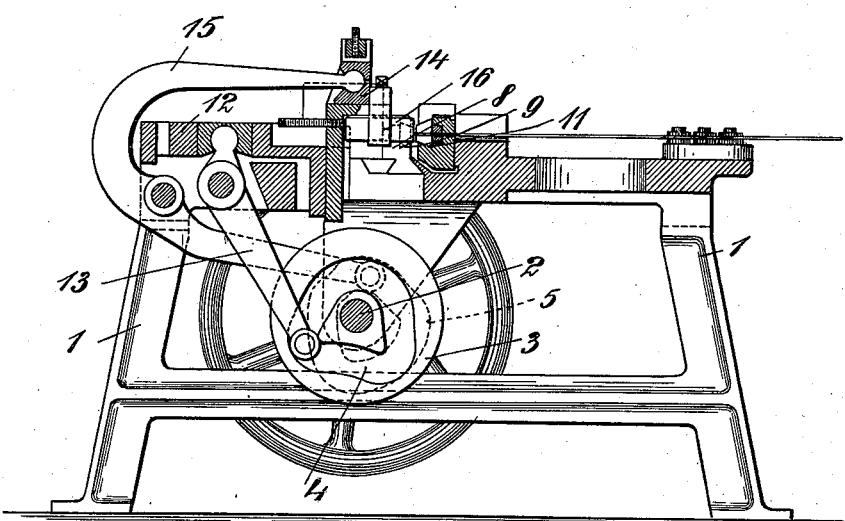
Witnesses
H. H. Knight
E. M. Fenster
Inventor
Jakob Wikschtröm
by Knight Bros.
his attorneys

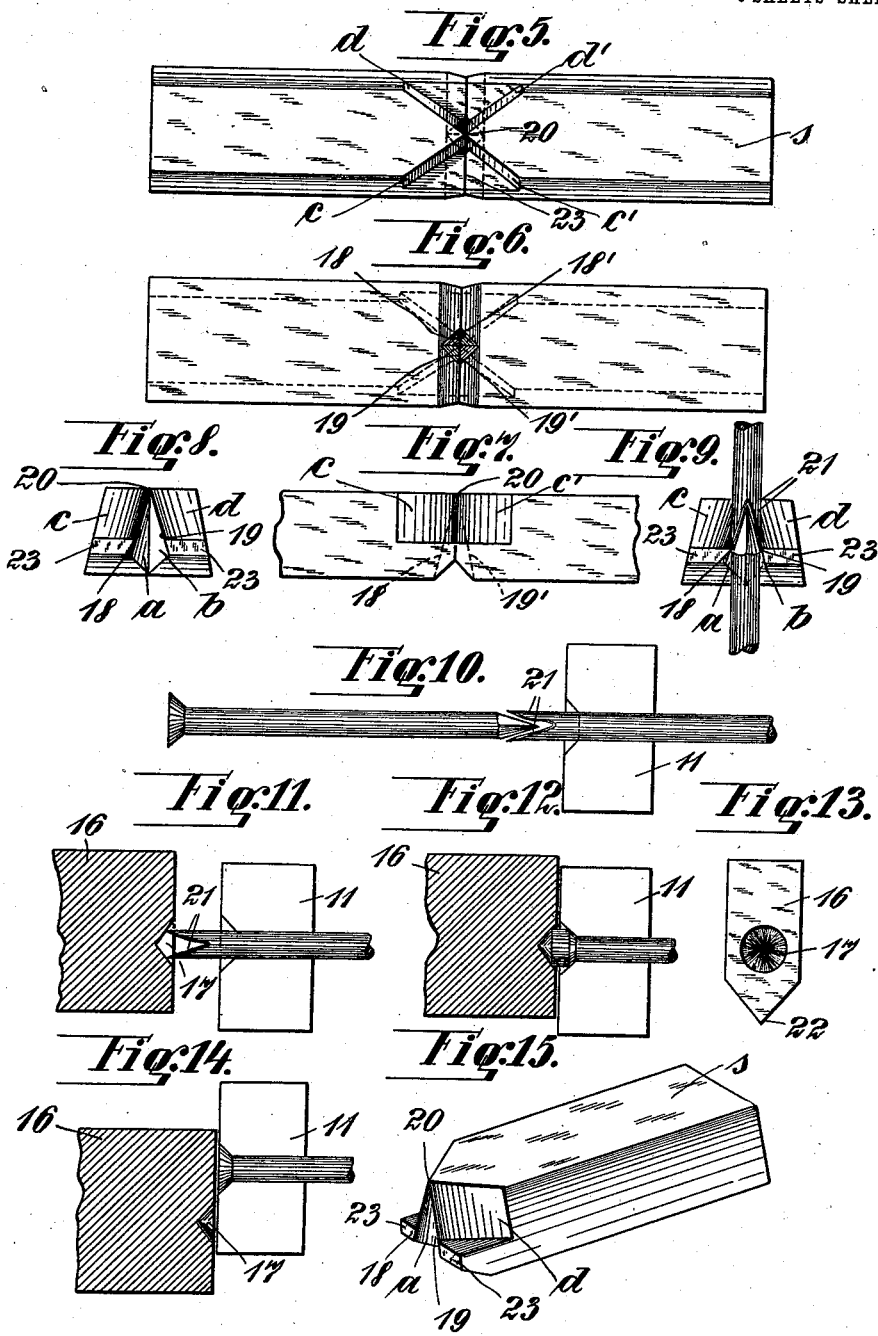

J. WIKSCHTRÖM.
MACHINE FOR MAKING WIRE NAILS AND PINS.
APPLICATION FILED JAN. 22, 1910.

1,014,732.

Patented Jan. 16, 1912.

6 SHEETS—SHEET 5.

Witnesses
H+Knight
E. M. Fenster

Inventor
Jakob Wikschtröm
by
his attorneys

J. WIKSCHTRÖM.
MACHINE FOR MAKING WIRE NAILS AND PINS.
APPLICATION FILED JAN. 22, 1910.

1,014,732.

Patented Jan. 16, 1912.
6 SHEETS—SHEET 6.

Witnesses:
Emanuel M. Fenster.
H. Alfred Jauke.

Inventor:
Jacob Wikschtröm
by Smight & Bro.
his attorneys.

UNITED STATES PATENT OFFICE.

JAKOB WIKSCHTRÖM, OF DUSSELDORF, GERMANY.

MACHINE FOR MAKING WIRE NAILS AND PINS.

1,014,732.  Specification of Letters Patent.  Patented Jan. 16, 1912.

Application filed January 22, 1910. Serial No. 539,593.

*To all whom it may concern:*

Be it known that I, JAKOB WIKSCHTRÖM, a citizen of the German Empire, residing at Dusseldorf, in the Kingdom of Prussia, Germany, have invented certain new and useful Improvements in Machines for Making Wire Nails and Pins; and I do hereby declare the following to be a full, clear, and exact description of the invention, such as will enable others skilled in the art to which it appertains to make and use the same.

My invention relates to improvements in machines for making wire nails and pins from a continuous length of wire. And the object of the improvements is to provide a machine of this class by which wire nails or pins can be manufactured without any waste of material whatever.

With this object in view my improved machine embodying the invention consists of the combination of the following elements: first, means for simultaneously cutting a blank from the wire and shaping the cut end into the form of a point, the cutting means being so constructed, that the parts of the wire end which are not required in forming the point are not separated from the wire but remain integral therewith, so that they can afterward be shaped into a head for the following blank, second, means for preliminarily shaping the cut and projecting end of wire in such a way, that a head can be formed from the same, and third, means for heading the previously shaped end of the wire. In the preferred form of the means for preliminarily shaping the end of the wire before heading the same, such preliminary shaping is effected in part by the nail cutting die and in part by means independent of the said dies and operating after the cutting operation.

My invention also relates to the construction of the dies which have proved particularly useful in the aforesaid combination of elements, and which permits the cutting and shaping of the wire without any waste, and to certain details of construction to be described hereinafter and particularly pointed out in the appended claims, reference being had to the accompaying drawings forming a part of this specification.

Figure 16:
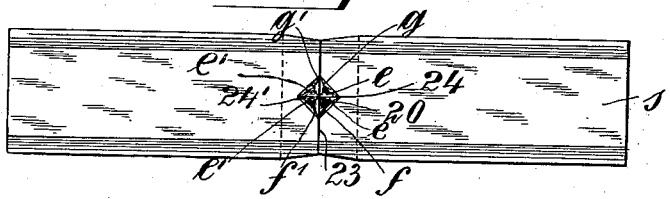
Figure 17:
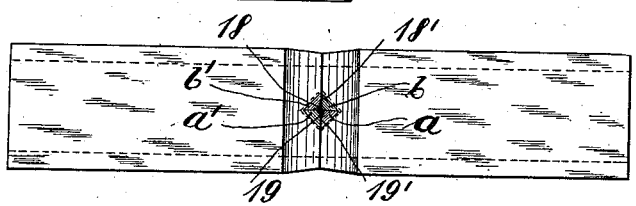
Figure 18:
Figures 19, 20:
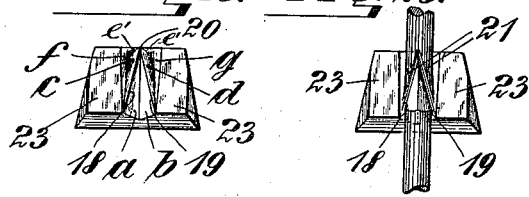
Figure 16A:
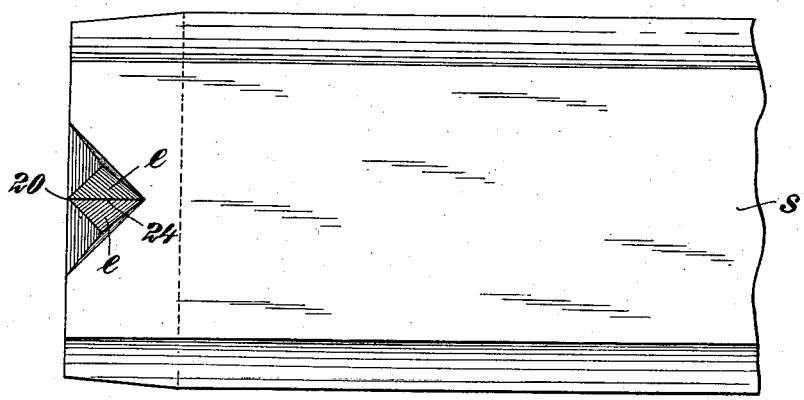
Figure 21:
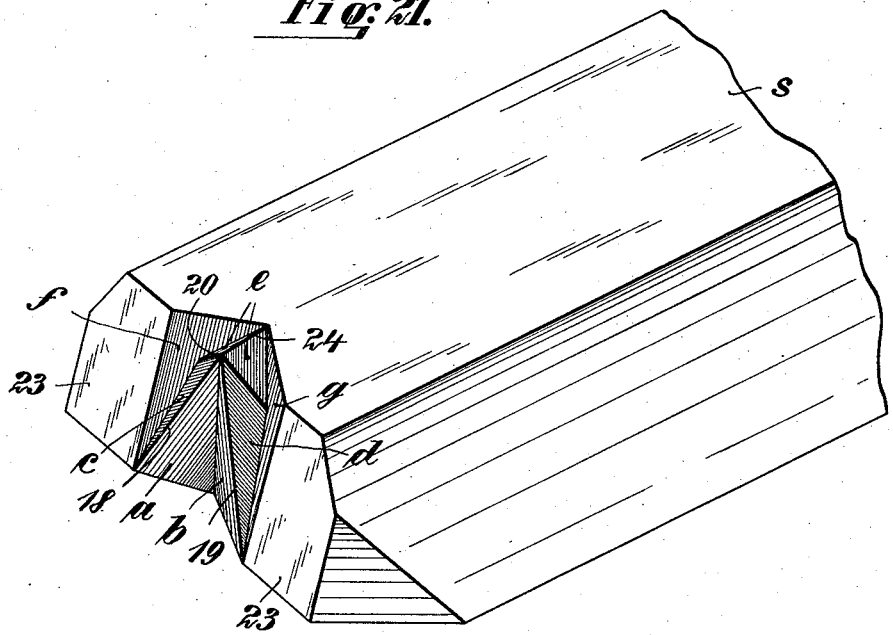

In said drawings,—Figure 1, is a top view of my improved machine, Fig. 2, is a vertical cross-section of the same taken on the line 2—2 of Fig. 1, Fig. 2ª, is a vertical cross-section of the machine taken on the line 2ª—2ª of Fig. 3, Fig. 3, is a longitudinal cross-section of the machine taken on the line 3—3 of Fig. 1, and showing the cutting and pointing dies in their operative positions and the heading punch in its retracted or inoperative position, Fig. 4, is a similar longitudinal section of the machine showing the cutting dies in their retracted or inoperative positions and the heading punch in its operative position, Fig. 5, is a side view of the dies used in my improved machine seen in the direction of the feed of the wire and toward the point of the blank cut therefrom, Fig. 6, is a similar side view of the dies seen in the opposite direction, Fig. 7, is a plan view of the dies, Fig. 8, is an end view of one of the dies, Fig. 9, is a similar end view of one of the dies showing a pointed nail and the cut wire end in their positions after the cutting and pointing operation, Fig. 10, is an end view of one of the clamping blocks for the cut wire provided with a cavity for shaping the head on the same, Fig. 11, is a similar view, the previously manufactured nail being removed, and showing in addition the means for preliminarily shaping the cut end of the wire, said means being in their position before acting on the wire end, Fig. 12, is a similar view of the parts illustrated in Fig. 11, and showing the means for preliminarily shaping the wire end in its position after performing such preliminary shaping operation, Fig. 13, is an end view of the aforesaid means for preliminarily shaping the wire end, Fig. 14, is a side view similar to that of Figs. 11 and 12, showing the wire clamping means and the means for heading the wire, the latter being shown in its completed form, Fig. 15, is a perspective view of one of the dies, Fig. 16, is a side view similar to that of Fig. 5 and showing a modification of the dies, the latter being seen from the side of the wire feeding mechanism, Fig. 16ª is a similar side view showing a single die, Fig. 17, is a similar side view of the dies similar to that of Fig. 16 and seen from the side of the punch, Fig. 18, is a plan of the dies shown in Figs. 16 and 17, Fig. 19, is an end view of one of the dies shown in Figs. 16 to 18, Fig. 20, is an end view of the same and showing in addition the blank and the end of the wire after the cutting and pointing operations, and Fig. 21, is a perspective view of the die illustrated in Figs. 16 to 20.

The same letters of references have been used in all the views to indicate corresponding parts.

Referring to the example illustrated in the drawings, a main driving shaft 2 located in suitable bearings of the machine frame 1 carries a disk 3 and at both sides of the latter circumferentially grooved cam disks 6. The disk 3 is formed at both faces with cam grooves 4 and 5.

Within the upper central part of the machine frame two slides 8 are located which are transversely slidable in suitable guide ways, and which carry the cutting dies 9. Each of the said slides is engaged by an arm of a rocking lever 10 the opposite arm of which is guided in the groove 7 of one of the cam disks 6. Adjacent to the cutting and clamping dies a pair of clamping jaws 11 for the wire fed between the cutting and pointing dies are disposed. The said clamping jaws are reciprocated to successively clamp and release the wire, as will be described hereinafter, and such reciprocating movement may be imparted to the clamp by any preferred means, such for example as cam disks 6', 7', mounted on the main shaft 2 and coöperating with rocking levers 10' engaging said jaws. The frame also carries a slide 12 adapted to be moved longitudinally of the machine by means of a lever 13 which with one of its arms engages the said slide and with the other arm the cam groove 4 of the disk 3.

On the part of the slide 12 which is adjacent to the pointing and cutting dies 9 a vertically slidable block 14 is located. The latter is engaged by one arm of a rocking lever 15, the other arm of which engages in the cam groove 5 of the disk 3. A punch 16 is adjustably secured to the said slide block 14, and the said punch is formed with a cavity 17 shown in detail in Figs. 11 to 14.

One of the features of my present invention relates to the construction of the dies. And in this respect my invention consists in so constructing the said dies, that the blanks are not cut transversely of the axis of the wire, so that when pointing the blank certain portions of the same are wasted, but in so cutting the wire, that those portions of the blank which in the usual method were wasted remain on the end of the wire. In combination with the said dies the invention consists in providing means on my improved machine whereby the said projecting portions of the wire are made use of in heading the wire so that the said portions form a part of the head of the following nail.

In the example shown in Figs. 5 to 15 of the accompanying drawings, each cutting and pointing die is formed at its front or working end with two transverse converging cutting edges 18, 19 and 18', 19' intersecting each other in one of the side faces *s* of the die, as shown at 20, and the surfaces forming said edges slope respectively outward and inward and away from the plane of the edges, so as to form prismatic projections on the front or working ends of the dies. Thereby inner surfaces *a* and *b* are formed between the cutting edges which provide transverse notches one in each of the dies, and the notches coöperate to shape the point of the nail. In the example shown the said surfaces are plane, so that the nail is formed with a pyramidal point. However, it should be understood, that my invention is not limited to the form of the notches shown. For example, by rounding the said surfaces, the nails can be formed with conical points. The surfaces which slope outward and away from the cutting edges have been indicated by the letters *c*, *d* and *c'*, *d'* respectively. At the point 20 the surfaces *a*, *b*, *c*, *d* intersect each other and the side face *s*. If the wire is fed between the said dies, and the latter are moved toward each other, the cutting edges 18, 19 and 18', 19' cut the said wire so as to form an angular slit at its end. The central portion of the wire which is between the faces *a*, *b*, and *a' b'* is pointed by the latter, while the portions of the wire which are outside the said faces remain on the wire, as shown in Fig. 10, because the edges coincide at one point 20 only, so that there is sufficient room at both sides of the notch for the lateral portions of the wire by reason of the inclined faces *c*, *d* and *c'*, *d'*. After the blank has thus been separated from the wire, the punch 16 is thrown into operation. The said punch is formed at a part of its face with a cavity 17, and its lower end is made in the form of a wedge 22, as is shown in Fig. 13. If the parts are in the position shown in Fig. 2, and the main shaft is rotated, the cam grooves 7 cause the cutting dies 9 to be advanced toward each other. In the mean time the block 14 carrying the punch 16 is in its upper or inoperative position, so that it does not interfere with the movement of the said cutting and pointing dies. Fig. 3 shows the levers 13 and 15 in the positions in which the cutting dies have again been separated by the cam groove 7 after performing the cutting and pointing operations, and the dies are held in this inoperative position, until the revolution of the main shaft is completed. In this position of the parts a completed nail has dropped downward, and the slit ends 21 of the wire project beyond the clamping jaws 11. The groove 4 gradually recedes from the center of the main shaft, whereby the lever 13 is rocked so as to shift the slide 12 toward the end of the wire projecting through the clamping jaws, which are now in their clamping position. At the same time the groove 5 approaches toward the center of its disk, so that the lever 15 shifts the block 14 and the punch 16 secured thereto downward. The said downward movement is temporarily interrupted, as shown in Fig. 4. In this position the cavity 17 of the punch 16 is in front of the ends 21 of the wire, so that it is now ready to bend the said ends together and to perform a preliminary heading operation, as is shown in Figs. 11 and 12. The next portion of the groove 4 approaches again slightly the center of its disk 3, whereupon it recedes again to the former distance from the center. By the said approaching of the groove toward the center the punch is again slightly retracted from the wire, and with the punch in this position, the groove 5 approaches the center further, so that the block 14 continues its downward stroke, until a plane portion of the punch 16 arrives in front of the wire. When the groove 4 has receded from the center as described, the punch is again advanced toward the preliminarily headed end of the wire. Thereby the head of the wire is brought into its finished form, as is shown in Fig. 14. The following portions of the grooves 4 and 5 are so formed, that the block 13 is again raised into its upper position, and the slide 12 is retracted, so that the cutting and pointing dies can again be forced toward each other, as described.

If the dies used in the machine have the form shown in Figs. 5 to 15, and also if dies of the construction shown in Figs. 16 to 21 are used, it is sometimes desirable to force the ends 21, 21 of the end of the wire together, before subjecting the same to the preliminary heading operation by means of the cavity 17 of the punch 16. For this purpose various means may be employed. In the example shown in the drawings, the cavity 17 of the punch 16 is constructed in such a way as to bend the said ends of the wire together, before preliminarily heading the same. For this purpose the said cavity is made conical, as shown in the figures. Should the blank not be separated from the wire when the cutting and pointing dies have been retracted, it is pushed downward by the wedge shaped end 22 of the punch 16.

In order to avoid an excessive pressure of the cutting edges 18, 19 and 18', 19' on each other when cutting a blank, which might injure the said edges, I prefer to construct the front ends of the dies with plane surfaces as 23 which are moved in contact with each other in the cutting operation of the die and thereby take up the larger amount of the pressure.

In the example of the dies so far described, the portions 21 of the wire are bent outward by the outwardly flaring surfaces *c, d* and *c', d'* when cutting and pointing a blank. In Figs. 16 to 21 I have shown a modification of the said dies in which such outward bending is avoided. The said dies may be used in combination with the means for bending the ends 21 together, or without the same. In the said modification the plane portions of the front faces are so large, that the pressure on the cutting edges 18, 19 and 18', 19' is further decreased, whereby the durability of the dies is further increased. Also in the modification shown in Figs. 16 to 21 the front or working faces of the dies are formed with converging cutting edges 18, 19 and 18', 19' which inclose a notch *a, b* and *a', b'* for shaping the point of the nail. Extending rearward from the point 20 where the cutting edges 18 and 19 intersect, a longitudinal edge 24 is formed by the outwardly sloping surfaces *c* and *d* by faceting the edges which they form when intersecting with the outer face *s* whereby relieving surfaces are formed, as shown at *e* in Fig. 21. The front ends of the dies are formed with surfaces 23 which are located in the plane of the cutting edges 18 and 19. From the surfaces *c* and *d* surfaces *f* and *g* slope outward and toward the front side of the die which surfaces intersect the plane faces 23. The construction of the coöperating die is the same as that of the die described, and it is also formed with a longitudinal edge 24' and outwardly sloping faces *f'* and *g'* and plane end faces 23'. When advancing the dies toward each other, the wire is cut by the edges 18, 19 and 18', 19' in the same way as has been described with reference to Figs. 5 to 9 and 15, as appears from Fig. 20. The ends 21 of the wire are held within the notches located at the side of the notches *a, b* and *a', b'*. Through the coöperation of surfaces *f* and *g* and *c* and *d* of each die half and through the relief by surfaces *e, e'* which form the edges 24, 24', the ends 21 of the wire are prevented from sprawling and the metal from being swaged out. The heading operation is the same as that described with reference to the dies shown in Figs. 5 to 9 and 15. The punch 16 performs at first a preliminary heading operation by means of its cavity 17, whereupon the plane part of the punch 16 completes the heading operation.

I claim:

1. In a wire nail making machine, the combination, of means to separate a blank from a wire by two cuts which begin from a transverse line passing through the body of the wire and extend outward from said line and toward the end of the wire and being separated and at an angle to the longitudinal axis of the wire and leaving bifurcated portions on the wire, and means to form said bifurcated portions into a head.

2. In a wire nail making machine, the combination, of a pair of nail pointing and cutting dies adapted to separate a blank from a wire by two cuts which begin from a transverse line passing through the body of the wire and extend outward from said line and toward the wire end being separated and at an angle to the longitudinal axis of the wire and to leave bifurcated portions on the wire, and means to form said bifurcated portions into a head.

3. In a wire nail making machine, the combination of a pair of reciprocating nail pointing and cutting dies adapted to cut a blank from the wire, each of said dies having its front or working end formed with two transverse intersecting cutting edges, the surfaces forming said edges sloping outward and inward and away from the plane of said edges, said outwardly sloping surfaces providing on both sides of the cutting edges cut away portions which extend to the side face of the die which is adjacent to the point of intersection of the cutting edges, means to move said dies with their cutting edges in contact with each other transversely of the wire and to a plane within the body of the wire and to separate the dies, and means to form the portions remaining on the wire after the cutting operation into a head.

4. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect, means to operate said dies, and means to form the portions remaining on the wire after the cutting operation into a head.

5. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect, and the front ends of said dies being formed with coöperating faces adapted to abut against each other in operation of the dies and to limit the stroke of the dies toward each other, means to operate said dies, and means to form the portions remaining on the wire after the cutting operation into a head.

6. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect, and the front ends of said dies being formed with coöperating faces in the plane of the cutting edges adapted to abut against each other in operation of the dies and to limit the stroke of the dies toward each other, means to operate said dies, and means to form the portions remaining on the wire after the cutting operation into a head.

7. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect and converging at their ends adjacent to the point of intersection of said edges into an edge extending from said point of intersection rearward, means to operate said dies, and means to form the portions remaining on the wire after the cutting operation into a head.

8. In a wire nail making machine, the combination of a pair of reciprocating nail pointing and cutting dies adapted to cut a blank from the wire, each of said dies having its front or working end formed with two transverse intersecting cutting edges, the surfaces forming said edges sloping outward and inward and away from the plane of said edges, each of said outwardly sloping surfaces forming a notch with a bounding surface which extends to the front or working face of the die, said notches extending to the side face of the die which is adjacent to the point of intersection of the cutting edges, means to move said dies with their cutting edges in contact with each other transversely of the wire and to a plane within the body of the wire and to separate the same, and means to form the portions remaining on the wire after the cutting operation into a head.

9. In a wire nail making machine, the combination with wire feeding means, of a pair of reciprocating nail pointing and cutting dies adapted to cut a blank from the wire and moving toward each other at right angles to and up to the central axis of the wire, and away from each other, each of said dies having its front or working end formed with two transverse cutting edges intersecting each other and terminating in one of the side faces of the die, the surfaces forming said edges sloping outward and inward and away from the plane of said edges, each of said outwardly sloping surfaces forming a notch with a bounding surface which extends to the front or working face of the die, said notches extending to the side face of the die in which said cutting edges intersect, means to operate said dies, and means to form the portions remaining on the wire after the cutting operation into a head.

10. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, the outwardly sloping surfaces converging at their ends adjacent to the point of intersection of said cutting edges into an edge extending from said point of intersection rearward, and each of said surfaces forming a notch with a bounding surface which extends to the front or working face of the die, said notches extending to the side face of the die in which said cutting edges intersect, means to operate said dies, and means to form the portions remaining on the wire after the cutting operation into a head.

11. In a wire nail making machine, the combination of means to separate a blank from a wire by two cuts which begin from a transverse line passing through the body of the wire and extend outward from said line and toward the end of the wire end being separated and at an angle to the longitudinal axis of the wire and leaving bifurcated portions on the wire, means to perform a preliminary heading operation on the portions remaining on the wire after the cutting operation, and means to complete the heading operation.

12. In a wire nail making machine, the combination of a pair of nail pointing and cutting dies adapted to separate a blank from a wire by two cuts which begin from a transverse line passing through the body of the wire and extend outward from said line and toward the wire end being separated and at an angle to the longitudinal axis of the wire and to leave bifurcated portions on the wire, means to perform a preliminary heading operation on the portions remaining on the wire after the cutting operation, and means to complete the heading operation.

13. In a wire nail making machine, the combination with wire feeding means of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect, means to perform a preliminary heading operation on the portions remaining on the wire after the cutting operation, and means to complete the heading operation.

14. In a wire nail making machine, the combination, of means to separate a blank from a wire by two cuts which begin from a transverse line passing through the body of the wire and extend outward from said line and toward the end of the wire end being separated and at an angle to the longitudinal axis of the wire and leaving bifurcated portions on the wire, means to bend together the portions remaining on the wire after the cutting operation, and means to form said portions into a head.

15. In a wire nail making machine, the combination, of a pair of nail pointing and cutting dies adapted to separate a blank from a wire by two cuts which begin from a transverse line passing through the body of the wire and extend outward from said line and toward the wire end being separated and at an angle to the longitudinal axis of the wire and to leave bifurcated portions on the wire, means to bend together the portions remaining on the wire after the cutting operation, and means to form said portions into a head.

16. In a wire nail making machine, the combination with wire feeding means, of a pair of reciprocating nail pointing and cutting dies adapted to cut a blank from the wire and moving toward each other at right angles to and up to the central axis of the wire and away from each other, each of said dies having its front or working end formed with two transverse cutting edges intersecting each other and terminating in one of the side faces of the die, the surfaces forming said edges sloping outward and inward and away from the plane of said edges, said outwardly sloping surfaces providing cut away portions on both sides of the cutting edges which extend to the side face of the die in which said cutting edges intersect, of means to bend together the portions remaining on the wire after the cutting operation, and means to form said portions into a head.

In testimony whereof I hereunto affix my signature in the presence of two witnesses.

JAKOB WIKSCHTRÖM. [L. S.]

Witnesses:
   OTTO KÖNIG,
   WILLY KLEIN.

---

Copies of this patent may be obtained for five cents each, by addressing the " Commissioner of Patents, Washington, D. C."